(12) United States Patent
Colvin et al.

(10) Patent No.: US 8,575,526 B1
(45) Date of Patent: Nov. 5, 2013

(54) SYSTEM AND METHOD FOR DISPENSING OF MULTIPLE KILL VEHICLES USING AN INTEGRATED MULTIPLE KILL VEHICLE PAYLOAD

(75) Inventors: Randy D. Colvin, Madison, AL (US); Adam M. Wuerl, Madison, AL (US); Michael S. Mak, Santa Clara, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 355 days.

(21) Appl. No.: 12/923,707

(22) Filed: Oct. 5, 2010

(51) Int. Cl.
*F42B 15/01* (2006.01)
*F41G 9/00* (2006.01)
*B64D 7/08* (2006.01)
*F42B 15/00* (2006.01)
*B64D 7/00* (2006.01)

(52) U.S. Cl.
USPC .............................. 244/3.1; 244/3.15; 89/1.11

(58) Field of Classification Search
USPC .............. 244/3.1–3.3; 89/1.11; 102/473, 480, 102/489, 499, 500
See application file for complete search history.

(56) References Cited

U.S. PATENT DOCUMENTS

| | | | | |
|---|---|---|---|---|
| 3,464,356 A * | 9/1969 | Robert et al. | ................ | 102/489 |
| 4,444,117 A * | 4/1984 | Mitchell, Jr. | ................ | 102/489 |
| 5,456,425 A * | 10/1995 | Morris et al. | ................ | 244/3.22 |
| 5,535,679 A * | 7/1996 | Craddock | ................ | 102/489 |
| 5,691,502 A * | 11/1997 | Craddock et al. | ................ | 102/489 |
| 5,710,423 A * | 1/1998 | Biven et al. | ................ | 244/3.1 |
| 6,481,666 B2 * | 11/2002 | Frucht | ................ | 244/3.15 |
| 6,817,568 B2 * | 11/2004 | Spate et al. | ................ | 244/3.15 |
| 6,889,935 B2 * | 5/2005 | O'Dwyer | ................ | 244/3.21 |
| 6,957,609 B2 * | 10/2005 | Ronn et al. | ................ | 102/489 |
| 7,219,853 B2 * | 5/2007 | Williams | ................ | 244/3.14 |
| 7,494,089 B2 * | 2/2009 | Williams et al. | ................ | 244/3.16 |
| 7,494,090 B2 * | 2/2009 | Leal et al. | ................ | 244/3.16 |
| 7,752,976 B2 * | 7/2010 | Banks | ................ | 102/489 |
| 8,084,724 B1 * | 12/2011 | Brosch et al. | ................ | 244/3.16 |
| 8,242,422 B2 * | 8/2012 | Olden et al. | ................ | 244/3.1 |
| 2009/0000465 A1 * | 1/2009 | Deflumere et al. | ................ | 89/1.11 |

* cited by examiner

*Primary Examiner* — Bernarr Gregory
(74) *Attorney, Agent, or Firm* — Buchanan Ingersoll & Rooney PC (57) ABSTRACT

An interceptor system and method for dispensing of multiple kill vehicles, including, a carrier vehicle having a central carrier vehicle axis and axial propulsion integrated into the carrier vehicle, a payload adapter associated with the carrier vehicle for connecting a payload to a boost vehicle, the payload adapter being located aft of the carrier vehicle, and multiple kill vehicles mounted to the carrier vehicle radially around a circumference of the carrier vehicle.

20 Claims, 8 Drawing Sheets

SYSTEM AND METHOD FOR DISPENSING OF MULTIPLE KILL VEHICLES USING AN INTEGRATED MULTIPLE KILL VEHICLE PAYLOAD

GOVERNMENT LICENSE RIGHTS

This invention was made with Government support under Contract Number W9113M-04-D-0001, awarded by the Missile Defense Agency. The Government has certain rights in this invention.

BACKGROUND

1. Field

An interceptor system and method are disclosed, such as a system which can be used for mid-course/spaceborne missile defense, and a method which can control such system.

2. Background Information

Missile defense systems are known which include space-based mid-course, hit-to-kill weapons using a single kill vehicle capability. As referenced herein, a kill vehicle is an spaceborne weapon device which can be dispensed in multiple quantities for engaging a threat after having been transported into a vicinity of the threat by a booster propulsion. Known systems include one or more separate and distinct booster stages, with a single payload attached with multiple kill vehicles. The payload is delivered to a destination (e.g., threat intercept location) using ground control and a separate booster stack.

Known ground-based missile defense systems have been developed for short, medium and long-range missile defense. A class of interceptors known as mid-course, kinetic interceptors provide payloads with aggressive flight profiles to counter current and future threats An integrated axial payload was developed for application in all phases of mid-course flight (early/mid/late) and across these weapon interceptors (kinetic energy interceptor (KEI)/Aegis Ballistic Missile Defense (ABMD).

The payload possesses propulsion resources in both "delta-V" and axial acceleration. The delta-V represents a maximum change that the propulsion system can impart on a velocity for increased range of the payload to engage a threat, while the axial acceleration can aid in cross-range/reach (lateral movement) for the payload.

Targeting of a threat is performed with a combination of ground radars and on-board payload infrared (IR) sensors. Because known systems are directed to use of a single kill vehicle, any space-based communication capability is destroyed during engagement with a threat. That is, communication is only maintained up to the point in time where the payload is expected to encounter a threat, where the kill vehicles physically hit-to-kill the threat objects.

SUMMARY

An interceptor system is disclosed herein for dispensing of multiple kill vehicles, comprising: a carrier vehicle having a central carrier vehicle axis and axial propulsion integrated into the carrier vehicle; a payload adapter associated with the carrier vehicle for connecting a payload to a boost vehicle, the payload adapter being located aft of the carrier vehicle; and multiple kill vehicles mounted to the carrier vehicle radially around a circumference of the carrier vehicle.

A method is also disclosed for controlling a payload for dispensing of multiple kill vehicles, the method comprising: controlling propulsion of a carrier vehicle, wherein multiple kill vehicles are attached to the carrier vehicle; and managing engagement of the kill vehicles with a threat using on-board guidance of the carrier vehicle, on-board kill vehicle guidance and allocating propulsion resources among extending range of the carrier vehicle, and guiding the carrier vehicle to provide for kill vehicle intercept of a threat based on a controlled dispensing of the kill vehicles.

BRIEF DESCRIPTION OF THE DRAWINGS

Other features and advantages disclosed herein will become readily apparent from the detailed description of exemplary embodiments when read in conjunction with the accompanying drawings, wherein like reference numerals have been used to represent like elements, and wherein.

DETAILED DESCRIPTION

Figure 1:
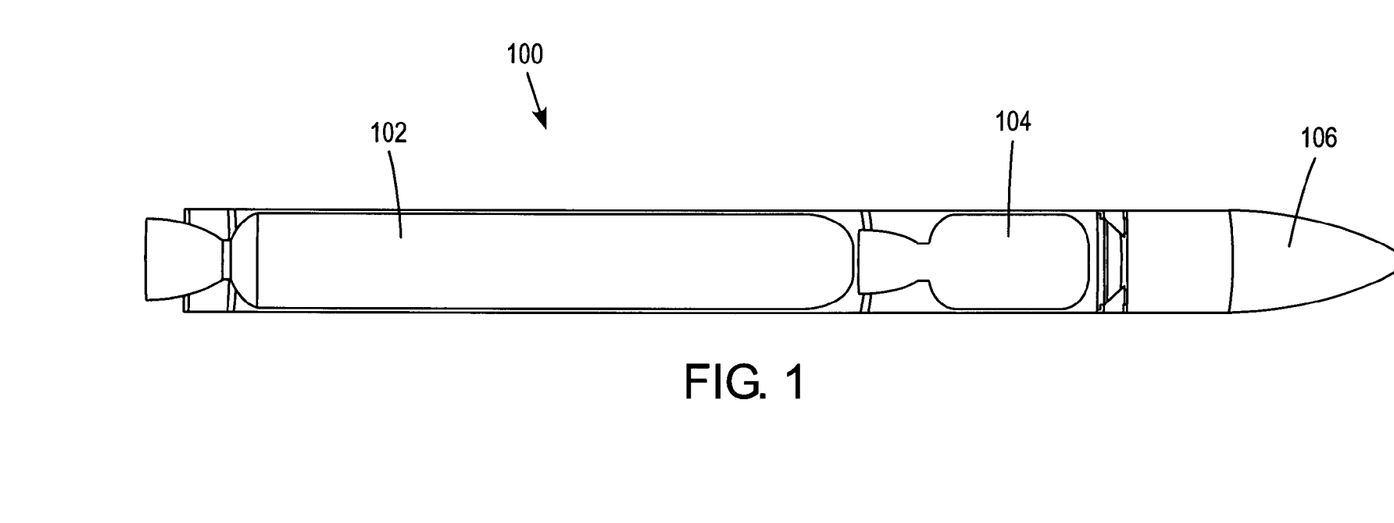
FIG. 1 shows an exemplary interceptor system having two booster stages and an integrated payload containing a carrier vehicle, a payload adapter, and multiple kill vehicles.

FIG. 1 shows an exemplary interceptor system 100 for space dispensing of multiple kill vehicles as a separating payload (e.g., exoatmospheric payload). The integrated payload can be configured to control the payload flight as well as control the multiple booster stages of a booster stack. The FIG. 1 system includes at least one booster (i.e., booster stage), represented as booster stages 102 and 104 attached to an axially integrated payload 106.

The FIG. 1 interceptor system 100 is shown to include the booster stages and the integrated payload within a missile shroud 108. The missile shroud can be included to provide desired missile profile aerodynamic properties, and thermal protection for the payload.

Figure 2:
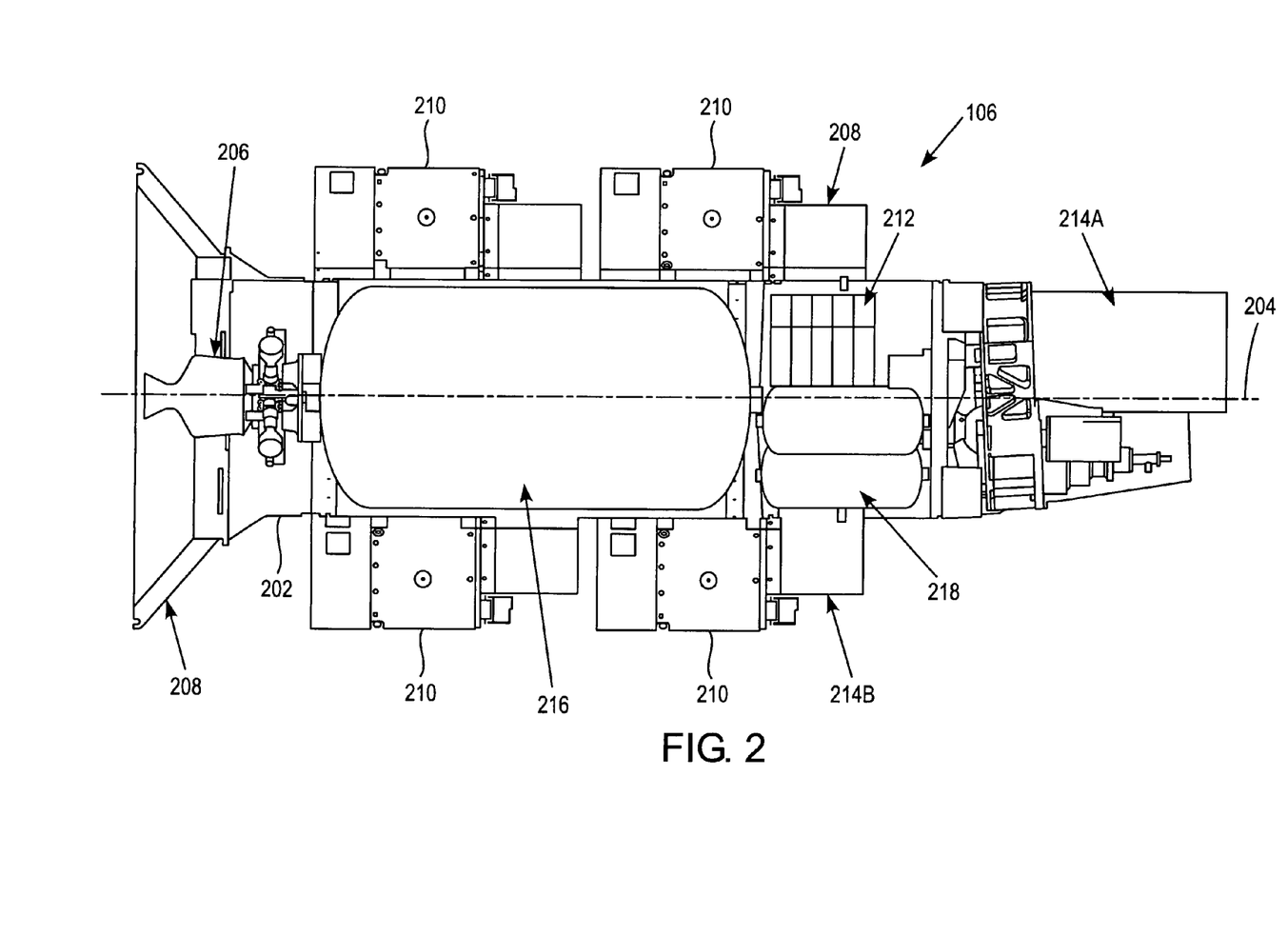
FIG. 2 shows an exemplary integrated payload which can be included in the FIG. 1 interceptor system.

FIG. 2 shows an exemplary embodiment of the integrated payload 106, with the shroud 108 removed. The integrated payload 106 includes a carrier vehicle 202 and a propulsion, represented as propulsion stage 206, located along the axis. A payload adapter 208 is associated with the carrier vehicle and located between the carrier vehicle and a booster. Plural kill vehicles 210 are mounted to the carrier about the axis 204 via the payload adapter which can also provide, for example, shock/vibration management (e.g., via a damping system such as springs, flexible mounts and/or controlled shock absorption systems).

As can be seen in the exemplary FIG. 2 integrated payload 106, a propulsion stage 206 is integrated with the plural kill vehicles of the carrier vehicle. Such a configuration can offer improved performance, including an ability to intercept multiple threats at different locations in a field of regard of the interceptor system. Such an integrated structure can be configured in a space and weight efficient manner to enhance fuel management and improve maneuverability. For example, after being maneuvered to within a zone of interest where imminent threats are anticipated, lateral acceleration of the integrated payload can be used to dispense kill vehicles in a strategic, sequential fashion over the entire field of regard, thereby eliminating multiple threats with a single interceptor system. To this end, the booster stages 102 and 104 (or any other booster stages included) can be jettisoned or destroyed when their fuel has been fully dispensed to further improve fuel economy and maneuverability.

In exemplary embodiments, the integrated payload 106 can have an overall weight less that of a third booster stage when combined with a single kill vehicle payload. Despite this reduction in weight, improved maneuverability, enhanced range and enhanced functionality can be achieved as will be described herein.

The FIG. 2 embodiment shows the integrated payload includes a carrier vehicle 202, a propulsion stage 206, a payload adapter 208 and multiple kill vehicles 210. The integrated payload can further include an engagement management controller, represented as an avionics and sensor controller 212 for managing engagement of the plural kill vehicles with a threat in the field of regard. A sensor represented as a carrier vehicle sensor 214A, and a multiple kill vehicle sensor 214B can be provided for detecting a threat and for interfacing with the engagement management controller 212. Thus, the engagement management controller can be considered an on-board mission computer for managing the multiple kill vehicles' guidance, control communication and health/status.

The engagement management controller can be used to oversee kill vehicle bussing for the multiple dispense events. Such a capability allows engagement of advanced, threats. The engagement management controller can allocate propulsion resources to carrier vehicle propulsion operations (e.g., increase burnout velocity) when needed to more rapidly advance the integrated payload and/or to increase the field of regard that the interceptor system has been missioned to defend. Rather than simply be advanced to a designated location using one or more booster stages, the engagement management controller can intelligently allocate fuel resources to navigate along a trajectory that can be modified in real-time to better adapt to a complex threat or array of threats. Such capability is achieved with the use of on-board propulsion control and threat sensing, coupled with lateral propulsion capability.

The integrated axial payload can fit (as exemplary variations) to the ground based interceptor (GBI), the kinetic energy interceptor (KEI) and the standard missile (SM-3) component of the Aegis and Ballistic Missile Defense System.

The engagement management controller 212 can execute any of multiple methods, algorithms and software for effectively utilizing the hardware design and architecture of the integrated payload 106. For example, the engagement management controller, can include: (1) a software and/or hardware module for allocating a propulsion resources of the integrated payload among a booster function for extending range of the integrated payload, and a payload mission for guiding the integrated payload to intercept multiple threats; (2) another (or the same) software and/or hardware module for controlling propulsion resources of the integrated payload for guiding the integrated payload to intercept multiple threats; (3) another (or the same) software and/or hardware module for commanding a dispensing of the plural kill vehicles, and for controlling guidance of the kill vehicles which have been dispensed; and/or (4) another (or the same) software and/or hardware module for controlling communication with kill vehicles which have been dispensed by integrated payload. The software modules described herein can be used to maintain communication with a dispensed kill vehicle up to and after a time of predicted intercept when the dispensed kill vehicle is expected to intercept the threat.

With regard to the software module mentioned, the engagement management controller 212 can make real-time trade offs between using the integrated payload's limited propulsion resources to increase the burnout velocity of the payload and/or to expand the engagement space against a threat complex. As referenced herein, a "threat complex" is a group of objects, such as missiles, having re-entry vehicle(s), penetration aids, debris and so forth. The avionics and sensor control capabilities of the engagement management controller can be used to control upper stage propulsion (e.g., propulsion stage 206 and optionally the FIG. 1 booster stages 102 and 104). As such, the engagement management controller 212 can perform navigation, guidance and control for the boost vehicle stages 102, 104 and 406. Such integrated capability of the engagement management controller can reduce costs, mass and complexity of the overall interceptor system.

A software module of the engagement management controller 212 used for controlling propulsion resources can take advantage of the integrated payload, with its upper stage propulsion 206, to enhance the payload delta-V. The engagement management controller 212 can leverage the increased delta-V in expanded performance and capability. For example, exemplary integrated payloads disclosed herein can dispense a group of kill vehicle assets to engage multiple threat objects, and then thrust to a new location to dispense additional kill vehicles associated with another portion of the threat complex. Such a capability is referred to herein as "bussing" and is attributable to enhanced capability of the integrated payload and its multiple kill vehicle assets.

The software module of the engagement management controller 212 for commanding dispensing of the plural kill vehicles can result in allocation of one or more kill assets to multiple targets in real time under the control and communication of the engagement management controller. As a result, the integrated payload 106 can achieve substantially enhanced effectiveness for multiple reasons. For example, due to on-board avionics and sensor control, the real time aspect of the integrated payload provide more accurate and current information as the integrated payload approaches a given target suite, such that the integrated payload can be guided to a more effective position for allocating kill vehicles to specific target assignments and manage system error sources. In addition, because the engagement management controller 212 includes a computer processor hosted on the integrated payload, as opposed to being located on the ground, targeting information can be provided to dispensed kill vehicles with reduced latency, thereby furthering increasing their effectiveness. For example, known sensor data can be acquired and processed on-board, without the added complexity of transmitting and receiving communications with respect to a ground controller. In addition to the foregoing advantages, a centralized control of the multiple kill vehicles in the integrated payload can allow an improved globally optional kill vehicle assignment to multiple targets and reduce asset wastage. Such capabilities can enable redundant robust fire control solutions.

A software module of the engagement management controller for maintaining communication with the kill vehicles, and for operating with only limited ground communications (e.g., for responding to a user initiated command and/or request for specific on-board data) can enable the integrated payload, as a single entity, to coordinate multiple target assignments. Communication between the carrier vehicle on the ground can be substantially reduced, thereby decreasing the demand for space-to-ground communication resources. This can reduce the size, mass and power of any communication subsystems associated with the carrier vehicle and/or the kill vehicles themselves. Because the integrated payload can maintain communications with kill vehicles throughout and beyond the engagement of a target, the integrated payload is able to collect, process and provide to the ground additional intelligence gathered immediately prior to, and after an intercept event.

In addition to the on-board engagement management controller 212, the FIG. 2 integrated payload 106 includes an integrated propulsion stage. An exemplary propulsion stage 206 of the illustrated integrated payload can include at least one fuel tank 216. The plural kill vehicles 210 can be mounted to the kill vehicle release mechanism 208 about the fuel tank 216. In the FIG. 2 embodiment, the propulsion stage 206 can be a multistage rocket (MR)-80C mono-propellant thruster, and each of the kill vehicles 210 can include a mono-propellant or bi-propellant with or without energy on target (EOT) capability. In the embodiment shown, 16 kill vehicles are shown. However, those skilled in the art will appreciate that any number of kill vehicles can be accommodated given the desired capability and design constraints for the application specified. The fuel tank 216 can, for example, be a hydrazine tank of titanium construction.

Helium pressurant tanks 218 can be included of titanium construction for pressuring the fuel system. In an exemplary embodiment, four such helium pressurant tanks can be included for an integrated payload packaged within an Orbital Boost Vehicle (OBV)-2 or modified KEI 2 stage shrouds.

Figure 3:
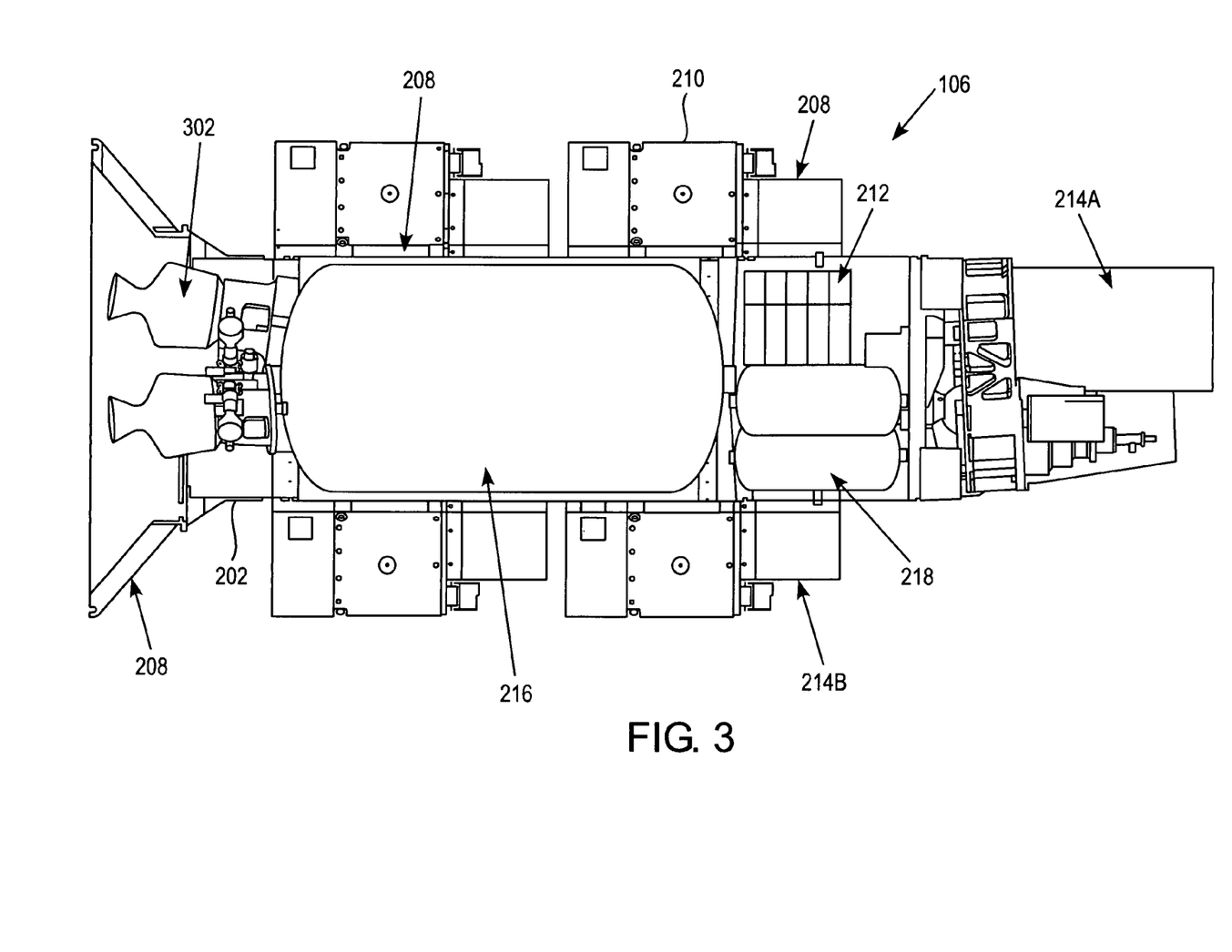
FIG. 3 shows another exemplary embodiment of the integrated payload of the FIG. 1 system.

FIG. 3 shows an alternate embodiment similar to that of FIG. 2 wherein like elements have been shown with like reference numerals. In FIG. 3, the propulsion stage 206 includes three monopropellant multistage rocket (MMR)-80 thrusters 302.

Figure 4:
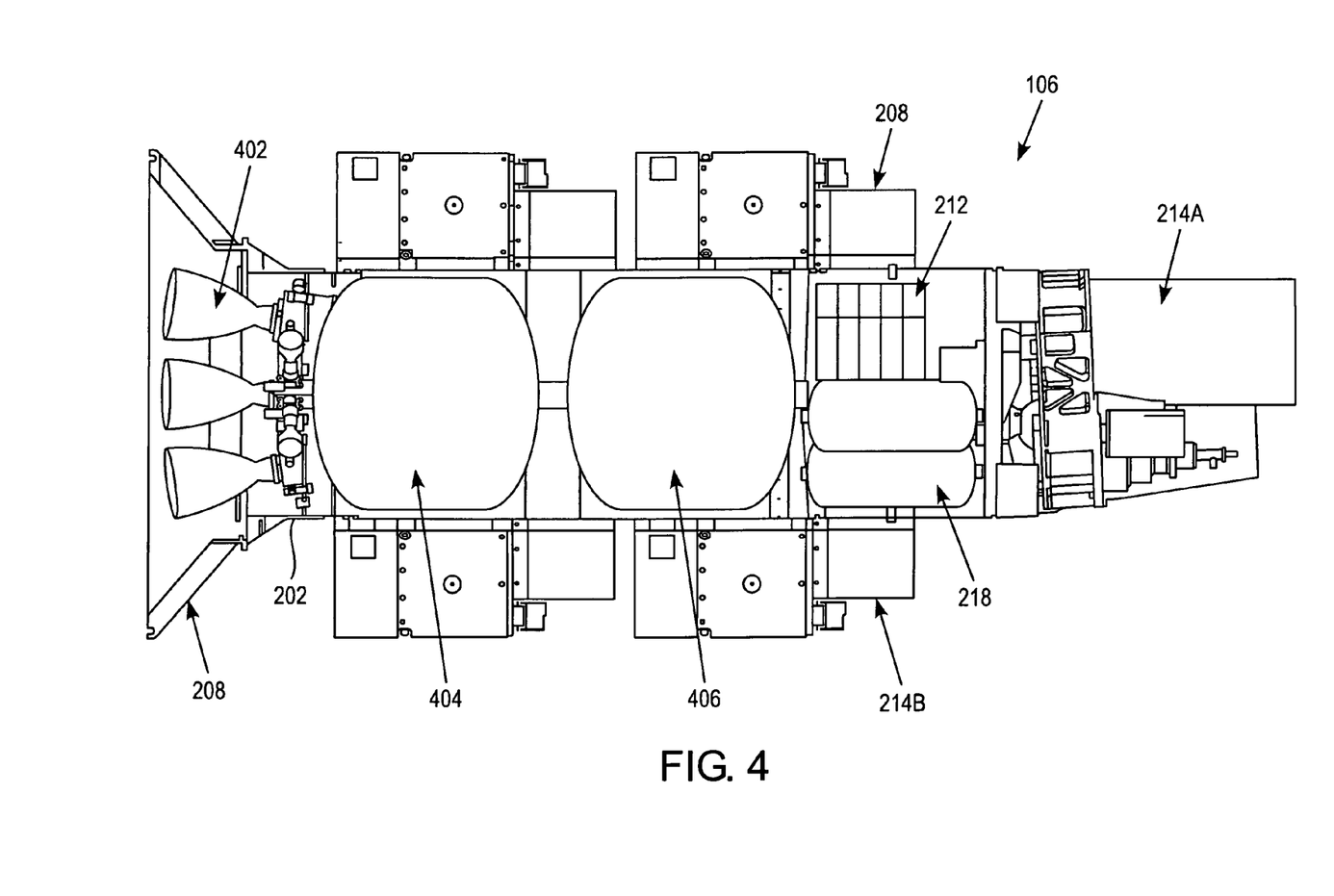
FIG. 4 shows another exemplary embodiment of the integrated payload of the exemplary FIG. 1 embodiment.

FIG. 4 shows yet another embodiment wherein the propulsion stage 206 includes four bi-propellant thrusters 402. In the FIG. 4 embodiment, the fuel tank 216 can for example, be an monomethylhydrazine (MMH) fuel tank. As those skilled in the art will appreciate MMH is a volatile hydrazine chemical with the chemical formula $CH_3(NH)NH_2$ used as a rocket fuel by propellant rocket engines and in hypergolic mixtures. The MMH fuel tank is designated 406, and a separate fuel tank can be an oxidizer tank of $N_2O_4$. Again, both fuel tanks 404 and 406 can be of titanium construction.

Figures 5A, 5B, 5C:
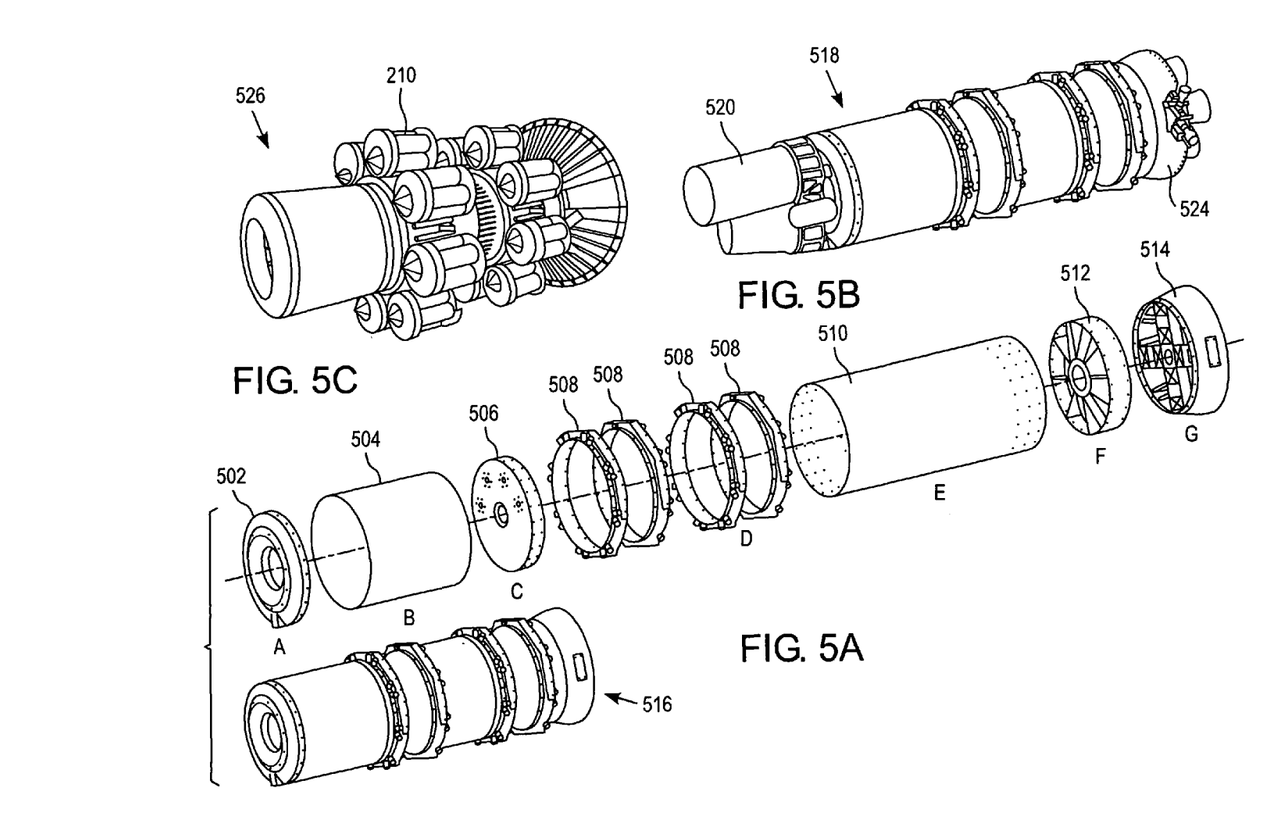
FIGS. 5A-5C show an exploded view of at least a portion of the exemplary integrated payload of the FIG. 1 system.

FIGS. 5A-5C shows an exemplary breakaway of the carrier vehicle 202 and payload adapter 208 of the FIG. 2 embodiment. An exemplary embodiment includes a payload adapter 208 for a 16 kill vehicle capability. However, as those skilled in the art will appreciate, any Kill adapter mechanism and carrier vehicle can be configured to accommodate any desired number of kill vehicles.

Referring to FIG. 5C, the carrier vehicle 202 includes a sensor bulkhead 502 for the sensor 214 of FIG. 2. A forward shell, such as a shell formed of a carbon fiber composite 504 serves as a mount for the sensor bulkhead 502. An avionics bulkhead 506 is provided on a side of the forward shelf opposite that of the bulkhead.

The payload adapter 208 can include kill vehicle attachment rings 508 formed, for example, of aluminum. An aft shell 510, formed for example, of a carbon fiber composite, supports the kill vehicle attachment rings.

A propulsion tank bulkhead formed, for example, of aluminum, and labeled 512, is provided at an aft end of the aft shell 510, and an aft bulkhead 514 is provided at a rear of the carrier vehicle. The complete assembly of the carrier vehicle is labeled 516.

In FIG. 5B, the carrier vehicle with the propulsion stage and sensor and avionics is labeled 518. As shown in the assembly 518, the sensor 520 and avionics 522 are located at a fore end of the carrier vehicle, and a propulsion stage 524 is located at the aft end mounted to the aft bulkhead.

In FIG. 5C, the integrated payload with mounted kill vehicles is labeled 526, and corresponds to the example illustrated in FIG. 2.

Figure 6:
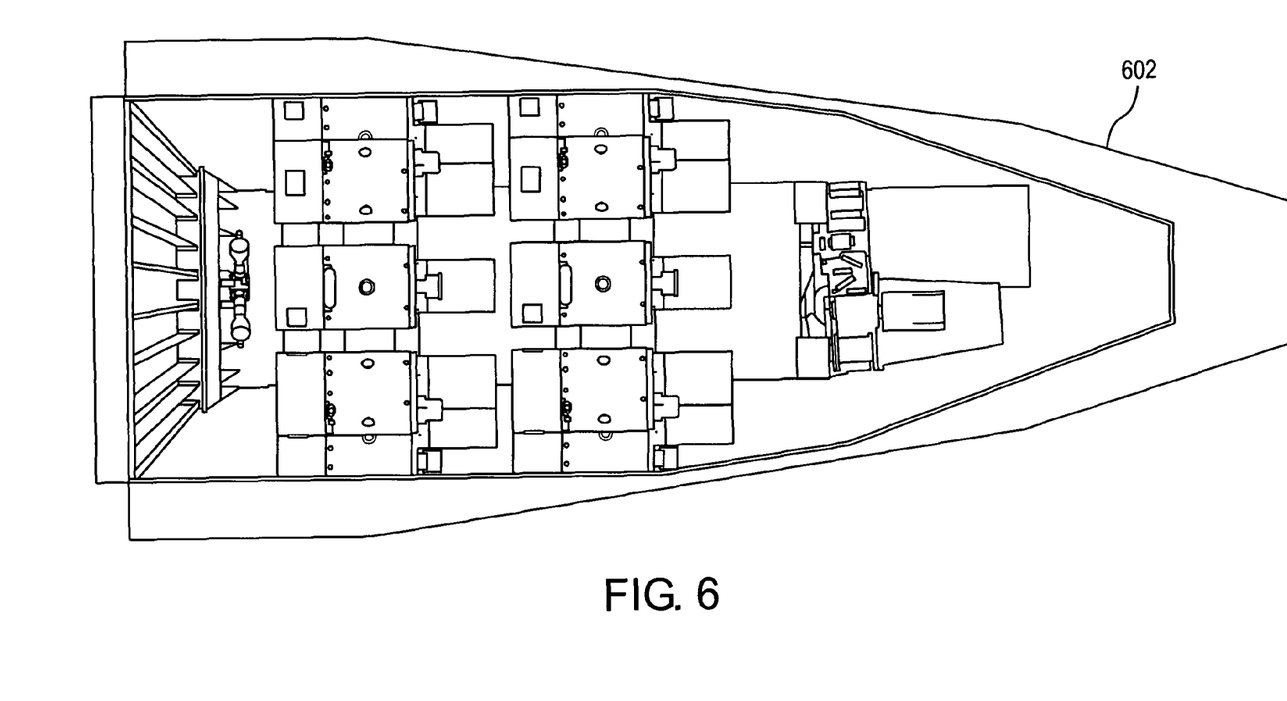
FIG. 6 shows an exemplary integrated payload encased in a shroud of the multistage interceptor system of FIG. 1.

FIG. 6 shows the FIG. 2 embodiment of the integrated payload within an exemplary OBV-2 stage and derived KEI 2 stage shroud labeled 603.

Figure 7:
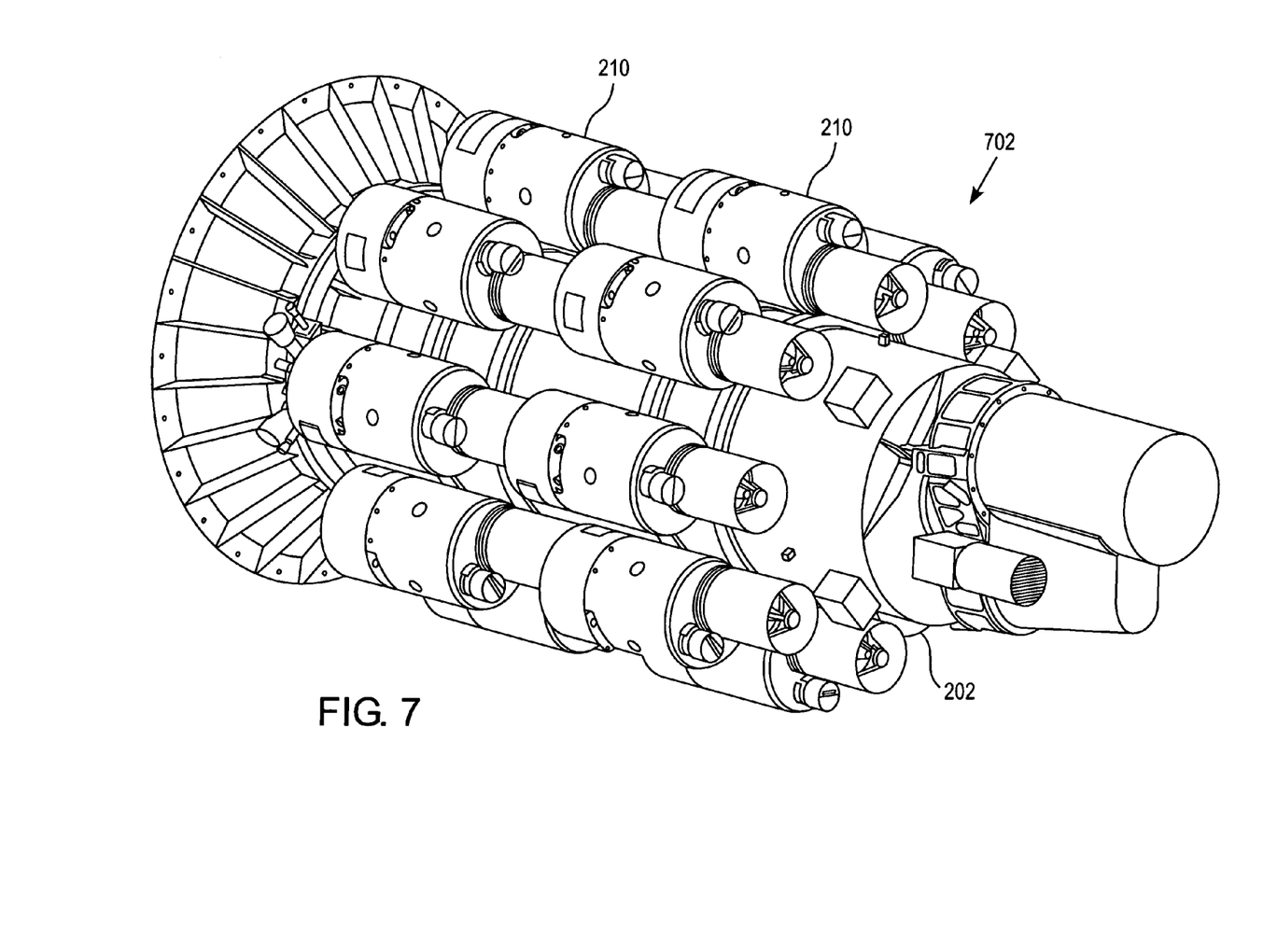
FIG. 7 shows a perspective view of the exemplary FIG. 2 integrated payload when viewed from a nose portion of the FIG. 1 interceptor system.

FIG. 7 shows a perspective view from the nose direction of the integrated payload. The integrated payload 702 contains elements with like reference numerals as referenced in FIG. 2.

Figure 8:
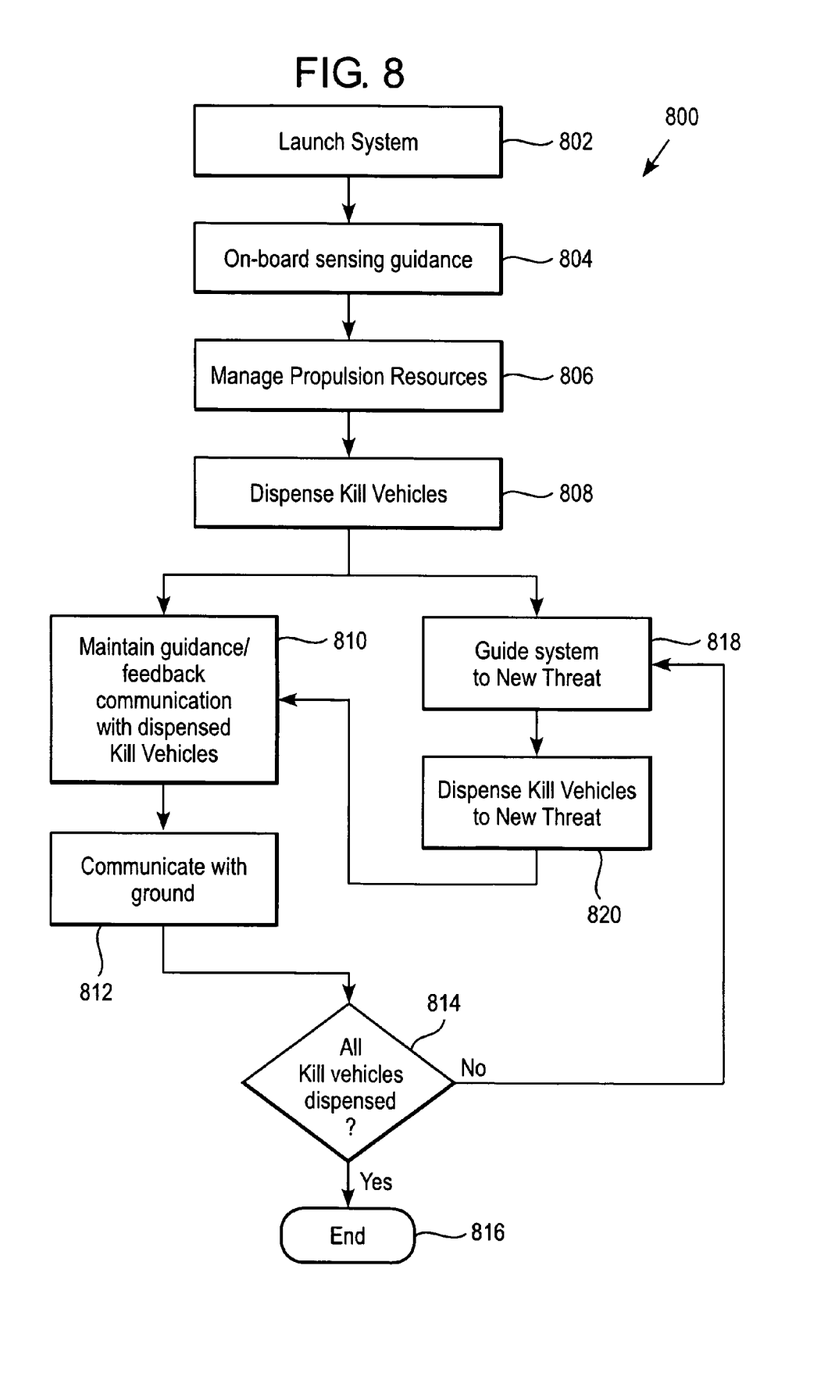
FIG. 8 shows an exemplary functional block diagram of an engagement controller of the exemplary FIG. 1 integrated payload.

FIG. 8 shows an exemplary flow diagram of the operational flow characteristics of the engagement management controller 212. The functional block diagram 800 includes an initial launch system block 802. An exemplary method for controlling the payload for dispensing of multiple kill vehicles using the interceptor system of FIG. 1, includes controlling the propulsion of the carrier vehicle, and managing engagement of the kill vehicles with a threat using on-board guidance of the carrier vehicle. The engagement management allocates system propulsion resources among extending range and/or velocity of the carrier vehicle, and guiding the carrier vehicle to drop the kill vehicles to intercept a threat based on a controlled dispensing of the plural kill vehicles. The on-board sensing of a threat, and guidance to a threat, is represented by functional block 804.

The engagement management module, or controller, manages propulsion resources in block 806 by assessing the number of identified threats detecting, calculating the distance to each within a given field of regard, and assessing the ability to engage each of the multiple threats for a given amount of fuel contained on the interceptor system. The engagement management module can determine the number of threats within the field of regard that the single interceptor system is able to engage through exploitation of lateral motion, balanced against extended range and/or velocity and number of kill vehicles in a direction to the threats. For example, the engagement module determines the largest number of threats which can be engaged in a given field of regard based on available fuel (e.g., destroy two near field, closely adjacent threats which are parallel to a current axis of flight, versus attempting to destroy two far field threats separated by a large distance along the current axis of flight).

In block 808, kill vehicles are dispensed to address a specific target complex within a field of regard. In block 810, communication is maintained with the kill vehicles to both guide the kill vehicles to the threat and receive communications regarding the kill vehicle engagement operation in real time. This information can be communicated to the ground in block 812 in any known fashion (e.g., in response to a user request and/or at specified periodic or aperiodic intervals). In decision block 814, a decision is made as how-to manage the kill vehicles on-board the carrier vehicle. When kill vehicles have been dispensed and engaged their target, the mission is complete as represented by end block 816.

Alternately, if kill vehicles remain on-board on the carrier vehicle, the engagement management controller guides the payload system to another threat in block 818, and additional kill vehicles are dispensed to the threat in block 820. Again, communication is maintained with dispensed kill vehicles in block 810 and carrier vehicle communication continues in block 812 until all kill vehicles have been dispensed.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An interceptor system for dispensing of multiple kill vehicles, comprising:
    a carrier vehicle having a central carrier vehicle axis and axial propulsion integrated into the carrier vehicle;
    a payload adapter associated with the carrier vehicle for connecting a payload to a boost vehicle, the payload adapter being located aft of the carrier vehicle; and
    multiple kill vehicles mounted to the carrier vehicle radially around a circumference of the carrier vehicle.

2. The interceptor system of claim 1, wherein the carrier vehicle, the payload adapter, and the kill vehicles constitute an integrated payload.

3. The interceptor system of claim 2, wherein the integrated payload comprises:
    an engagement management controller for managing engagement of the kill vehicles with the threat.

4. The interceptor system of claim 3, wherein the engagement management controller is an on-board guidance controller for guiding the interceptor system and wherein the carrier vehicle comprises:
    an on-board sensor device for sensing a threat to be engaged; and
    a guidance controller for guiding the payload system.

5. The interceptor system of claim 3, wherein the engagement management controller comprises:
    a software module for allocating propulsion resources of the integrated payload among: (1) a boost function for extending range of the integrated payload; and (2) a payload mission for guiding the integrated payload to intercept the threats.

6. The interceptor system of claim 3, wherein the engagement management controller comprises:
    a software module for controlling propulsion resources of the integrated payload for guiding the integrated payload for the kill vehicles to intercept multiple threats.

7. The interceptor system of claim 3, wherein the engagement management controller comprises:
    a software module for commanding a dispensing of the kill vehicles, and for controlling guidance of the kill vehicles which have been dispensed.

8. The interceptor system of claim 3, wherein the engagement management controller comprises:
    a software module for controlling communication with kill vehicles which have been dispensed by the integrated payload.

9. The interceptor system of claim 8, wherein the software module maintains communication with a dispensed kill vehicle up to and after a time of predicted intercept when the dispensed kill vehicle is expected to intercept the threats.

10. The interceptor system of claim 1, wherein the propulsion comprises:
    at least one fuel tank, the kill vehicles being mounted to the carrier vehicle about the fuel tank.

11. The interceptor system of claim 1, wherein the payload comprises:
    a mono-propellant thruster;
    a hydrazine fuel tank; and
    a helium pressurant tank.

12. The interceptor system of claim 11, wherein the payload comprises:
    multiple mono-propellant thrusters.

13. The interceptor system of claim 1, wherein the payload comprises:
    a bi-propellant thruster;
    a monomethylhydrazine (MMH) fuel tank;
    an oxidizer tank; and
    a helium pressurant tank.

14. The interceptor system of claim 1, wherein the kill vehicles each comprise:
    a kill vehicle with mono-propellant for kill vehicle propulsion upon being dispensed from the carrier vehicle.

15. Method for controlling a payload for dispensing of multiple kill vehicles, the method comprising:
    controlling propulsion of a carrier vehicle, wherein multiple kill vehicles are attached to the carrier vehicle; and
    managing engagement of the kill vehicles with a threat using on-board guidance of the carrier vehicle, on-board kill vehicle guidance, and allocating propulsion resources among extending range of the carrier vehicle, and guiding the carrier vehicle to provide for kill vehicle intercept of a threat based on a controlled dispensing of the kill vehicles.

16. The method according to claim 15, wherein the managing of engagement of the threats comprises:
    controlling propulsion resources of an integrated payload containing the carrier vehicle and the kill vehicles for guiding the integrated payload to intercept multiple threats.

17. The method according to claim 15, wherein the managing of engagement of the threat comprises:
    commanding and dispensing of the kill vehicles; and
    controlling guidance of the kill vehicles which have been dispensed using on-board engagement management of the carrier vehicle.

18. The method according to claim 15, wherein the managing engagement of the threat comprises:
    controlling communication with kill vehicles which have been dispensed using on-board communications of the carrier vehicle.

19. The method according to claim 15, comprising:
    mounting the kill vehicles about a fuel tank of the carrier vehicle.

20. The method according to claim 15, comprising:
    propelling a kill vehicle which has been dispensed from the carrier vehicle using a mono-propellant kill vehicle propulsion.

* * * * *